July 2, 1957 C. D. NESTLERODE ET AL 2,797,582
TUNING MECHANISM
Filed Sept. 12, 1955
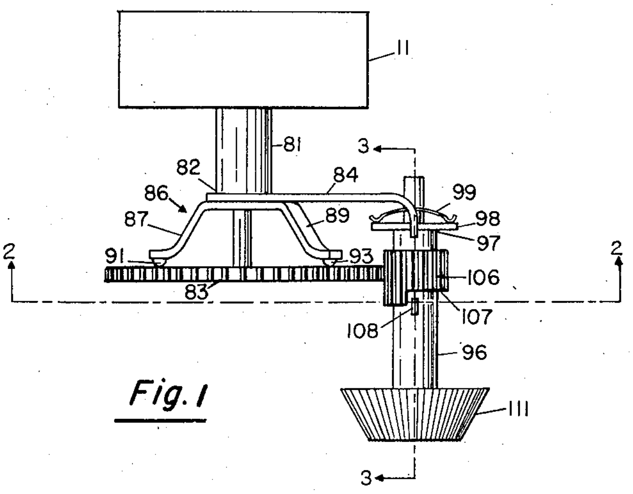
Fig. 1
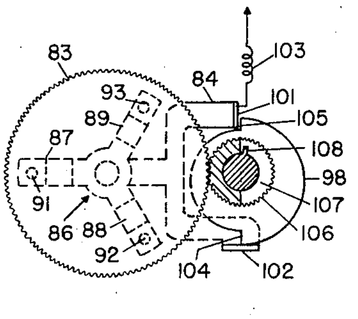
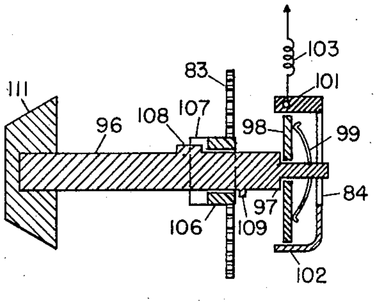
Fig. 2 Fig. 3
INVENTORS
DAVID C. FELT
CLIFFORD D. NESTLERODE
BY Darby & Darby
ATTORNEYS United States Patent Office 2,797,582

Patented July 2, 1957

2,797,582

TUNING MECHANISM

Clifford D. Nestlerode, Packanack Lake, and David C. Felt, West Englewood, N. J., assignors to Allen B. Du Mont Laboratories, Inc., Clifton, N. J., a corporation of Delaware Application September 12, 1955, Serial No. 533,832

3 Claims. (Cl. 74—10.5)

This invention constitutes a divisional application of our co-pending application, Serial Number 264,574, which application was filed on January 2, 1952, and issued as Patent No. 2,731,837 on January 24, 1957.

This invention relates to tuning mechanisms and particularly to such mechanisms which have provision for combined coarse and vernier tuning.

In certain devices, such as radio and television receivers, it is desirable to be able to rotate a tuning shaft quickly or coarsely to tune in a station and it is also desirable to be able to rotate the tuning shaft slowly or vernierly to achieve precise tuning. Certain other devices also require that a shaft be rotated coarsely and vernierly at will.

An object of the invention is to provide a tuning mechanism having means for both coarse and vernier tuning.

Another object is to provide a tuning mechanism having means for achieving coarse and vernier tuning with a single tuning knob.

A further object is to provide a tuning mechanism having adjustable detent tuning means for a plurality of predetermined dial settings.

Other objects will be apparent.

In accordance with the invention, a drive plate is rigidly fixed to a tuning shaft. A direct-drive member is mechanically coupled to the tuning shaft, and a vernier driving arm engages the drive plate and is actuated by a link arm and cam mechanism.

In the drawing,

Figure 1 shows a top view of an embodiment of the invention which provides continuous tuning;

Figure 2 is a sectional view taken on the line 2—2 of Figure 1; and

Figure 3 is a sectional view taken on the line 8—8 of Figure 6.

Referring now to the drawings it will be seen that the device 11 to be tuned has a tuning shaft 81 extending therefrom. The shaft 81 has a shoulder 82 thereon. A drive plate 83 is attached to an end of the tuning shaft 81. A link arm 84 is positioned against the shoulder 82. A vernier driving arm 86 is positioned between the link arm 84 and the drive plate 83, and is fixedly attached to the link arm 84. The driving arm 86 comprises a plurality of arms 87, 88, 89 which frictionally engage against the drive plate 83. The arms 87, 88, 89 are preferably made from resilient material. Dimples 91, 92, 93 are formed in the respective arms to provide a frictionally slidable bearing surface against the drive plate 83.

A drive shaft 96 is rotatably positioned in fixed relationship with respect to the tuning shaft 81 and has a shoulder 97 thereon. A cam member 98 is positioned on the shaft 96 against the shoulder 97. A retainer spring 99 holds the cam 98 in frictional engagement with the shoulder 97. The link arm 84 is provided with shoulders 101 and 102, the shoulder 101 being vertical and extending across the top surface of the cam 98. The shoulder 102 is positioned horizontally against the bottom edge of the cam 98. A spring 103 urges the bottom shoulder 102 of the link arm 84 against the surface of the cam 98. The shoulder 101 is positioned to serve as a stop for the cam 98, the cam 98 having shoulders 104 and 105 which abut against the shoulder 101 when the cam 98 is turned approximately one half turn. A pinion gear 106 is positioned on the shaft 96 and engages teeth on the drive plate 83. The pinion gear 106 is provided with a shoulder 107; a projection 108 on the shaft 96 is positioned in the confines of the shoulder 107 so that the shaft 96 will have approximately one half turn of free rotation or lost motion before it drives the pinion gear 106. A second projection 109 on the shaft 96 limits axial movement of the gear 106. A single tuning knob 111 is attached to the shaft 96.

The invention operates substantially as has heretofore been recited, viz., a drive plate or the gear 83 is attached to a tuning shaft. The tuning shaft is coarsely driven by a direct drive means, such as the gears 83, 106. Vernier tuning is accomplished by means of a vernier driving arm 86 which engages the drive plate. The vernier driving arm is actuated by a link arm 84 which in turn is actuated by a cam 98.

The embodiment of Figures 1 through 3 functions specifically as follows: For coarse tuning, the knob 111 is turned until the projection 108 drives the pinion gear 106 thereby rotating the gear 83 and tuning shaft 81. When the shaft 81 has been tuned slightly past the desired setting, which setting may be indicated by well known means such as a "tuning eye" tube, the knob 111 is rotated backwards, over a maximum range of approximately one half turn. When thus rotated backwards, the projection 108 disengages from the direct drive pinion gear 106 over the range of approximately one half turn. During this vernier rotation over one half turn, the cam 98 is rotated by means of its frictional abutment against the shoulder 97 and thereby rocks the link arm 84 over a limited angle whereby the driving arm 86, being attached to the link arm 84, rotates the drive plate 83 by virtue of its frictional engagement therewith. Thus, the device may be precisely tuned by a vernier adjustment over the limited angle of approximately one half turn of the knob 111. When it is desired to tune the device 11 to another setting, the knob 111 is turned until the pinion gear 106 is again engaged by the projection 108 whereupon the shaft 81 is rapidly adjusted to the new desired setting. During this coarse tuning, the cam 98 is stopped from rotation by virtue of one of the shoulders 104 or 105 abutting against the link arm shoulder 101; however, the shaft 96 is capable of continued rotation because of the sliding frictional contact between the shoulder 97 and cam 98. During the coarse tuning, the link arm 84 and the vernier driving arm 86 remain stationary, and the drive plate 83 slides with respect to the bearing surfaces provided by the dimples 91, 92, 93. It will be seen that the slidably mounted cam 98 and driving arm 86 provide the vernier driving means when the pinion gear 106 is disengaged by virtue of the shaft 96 being turned so that the projection 108 rides within the shoulder 107 of the gear 106; however, when the projection 108 engages the pinion gear 106, thereby directly driving the drive plate 83, the cam and driving arm are free to slide with respect to their respective bearing surfaces.

While a preferred embodiment of the invention has been described in detail, other embodiments and ramifications will be apparent to those skilled in the art. The true scope of the invention is defined by the appended claims.

What is claimed is:

1. A tuning mechanism comprising a tuning shaft, a drive plate attached to said shaft, a driving arm positioned in frictional engagement with said drive plate, a link arm attached to said driving arm, and a rotatable cam positioned to actuate said link arm, said link arm being provided with a first shoulder to engage the surface of said cam and a second shoulder positioned adjacent the surface of said cam, said cam having a pair of shoulders to limit the angle of rotary motion thereof by abutment against said second shoulder, means to rotate said driving plate to achieve coarse tuning and means to move said driving arm over a limited range to achieve vernier tuning.

2. The mechanism in accordance with claim 1, including a drive shaft frictionally coupled to said cam, a pinion gear positioned on said drive shaft and engaging said drive plate, and means to provide lost rotary motion between said pinion gear and said drive shaft over an angle substantially the same as said angle of limited rotary motion of said cam.

3. The mechanism in accordance with claim 2, in which said means to provide lost rotary motion comprises a shoulder on said pinion gear and a projection on said drive shaft positioned to engage said shoulder.

References Cited in the file of this patent

FOREIGN PATENTS

| | | |
|---|---|---|
| 217,540 | Great Britain | Oct. 12, 1923 |